(12) United States Patent
Carr et al.

(10) Patent No.: US 12,403,851 B2
(45) Date of Patent: Sep. 2, 2025

(54) TECHNIQUES FOR RESILIENCY IN AUTOMOTIVE-GRADE CHIPLETS

(71) Applicant: GM Cruise Holdings LLC, San Francisco, CA (US)

(72) Inventors: Alan Carr, San Mateo, CA (US); Chirinjeev Singh, San Jose, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 289 days.

(21) Appl. No.: 18/057,045

(22) Filed: Nov. 18, 2022

(65) Prior Publication Data

US 2024/0166147 A1 May 23, 2024

(51) Int. Cl.
*B60R 16/023* (2006.01)

(52) U.S. Cl.
CPC .................... *B60R 16/023* (2013.01)

(58) Field of Classification Search
CPC ........... B60R 16/023; H04L 1/16; H04W 4/48
See application file for complete search history.

(56) References Cited

U.S. PATENT DOCUMENTS

| 2013/0195210 A1* | 8/2013 | Swarbrick | G06F 13/423 375/259 |
| 2017/0187661 A1* | 6/2017 | Hui | H04L 51/18 |
| 2022/0067713 A1* | 3/2022 | Tietz | G06F 9/546 |
| 2022/0121611 A1* | 4/2022 | Walker | G06F 13/4291 |
| 2023/0035610 A1* | 2/2023 | Lee | G06F 12/0831 |
| 2023/0275742 A1* | 8/2023 | Kandele | H04L 9/0618 713/189 |

* cited by examiner

*Primary Examiner* — Caroline H Jahnige
(74) *Attorney, Agent, or Firm* — Honigman LLP; Matthew H. Szalach; Jonathan P. O'Brien

(57) ABSTRACT

An apparatus is described and includes an integrated circuit (IC) package, the IC package comprising an automotive-grade IC package for automotive applications, the IC package comprising a first chiplet; a second chiplet electrically connected to the first chiplet via a plurality of communications channels; and a monitoring feedback bus for providing information regarding health of the communications channels from the second chiplet to the first chiplet.

11 Claims, 10 Drawing Sheets

TECHNIQUES FOR RESILIENCY IN AUTOMOTIVE-GRADE CHIPLETS

BACKGROUND

Technical Field

The present disclosure relates generally to automotive systems and, more specifically, to techniques for increasing resiliency in chiplets having application in automotive systems.

INTRODUCTION

A chiplet is small integrated circuit (IC) device that includes a well-defined subset of functionality, such as logic, memory, or compute functionality. A chiplet is designed to be combined with other chiplets on an interposer in a single IC package. A group of chiplets may be implemented in a mix-and-match-type assembly, which provides many advantages over a conventional system on chip (SoC). Such advantages may include the fact that the same chiplet design (intellectual property or IP) may be used in many different devices. Additionally, chiplets may be fabricated using different processes, materials, and nodes each optimized for the particular function of the chiplet. Finally, chiplets may be tested before assembly within a package, thereby improving the yield of the final device.

Chiplets may be required to meet different grades, or levels, of resilience due to safety and other requirements of the system in which they are deployed. For example, Automotive Safety Integrity Level (ASIL) is a risk classification scheme defined by the ISO 26262 Functional Safety for Road Vehicles standard and defines safety requirements for compliance with the ISO 26262 standard. The ASIL is established by performing a risk analysis of a potential hazard by looking at the Severity, Exposure and Controllability of the vehicle operating scenario. The safety goal for that hazard in turn carries the ASIL requirements. The standard defines four ASILs: ASIL A, ASIL B, ASIL C, and ASIL D. Hazards that are identified as QM do not dictate any safety requirements.

The determination of ASIL is the result of hazard analysis and risk assessment. In the context of ISO 26262, a hazard is assessed based on the relative impact of hazardous effects related to a system adjusted for relative likelihood of the hazard manifesting those effects. In other words, each hazard may be assessed in terms of the severity of the possible injuries within the context of how much of the time a vehicle is exposed to the possibility of the hazard happening (e.g., "exposure") as well as the relative likelihood that a typical driver can act to prevent the injury (e.g., "severity" and "controllability"). In short, ASIL refers both to risk and to risk-dependent requirements and defines the standard minimal risk treatment for a given risk.

As noted above, the ASIL range from ASIL D, representing the highest degree of automotive hazard and highest degree of rigor applied in the assurance the resultant safety requirements, to QM, representing application with no automotive hazards and, therefore, no safety requirements to manage under the ISO 26262 safety processes. The intervening levels are simply a range of intermediate degrees of hazard and degrees of assurance required. ASIL D represents likely potential for severely life-threatening or fatal injury in the event of a malfunction and requires the highest level of assurance that the dependent safety goals are sufficient and have been achieved. Any product able to comply with ASIL D requirements would also comply with any lower level. The QM (Quality Management) level means that the risk associated with a hazardous event is not unreasonable and does not therefore require safety measures in accordance with ISO 26262.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Overview

Figure 1:
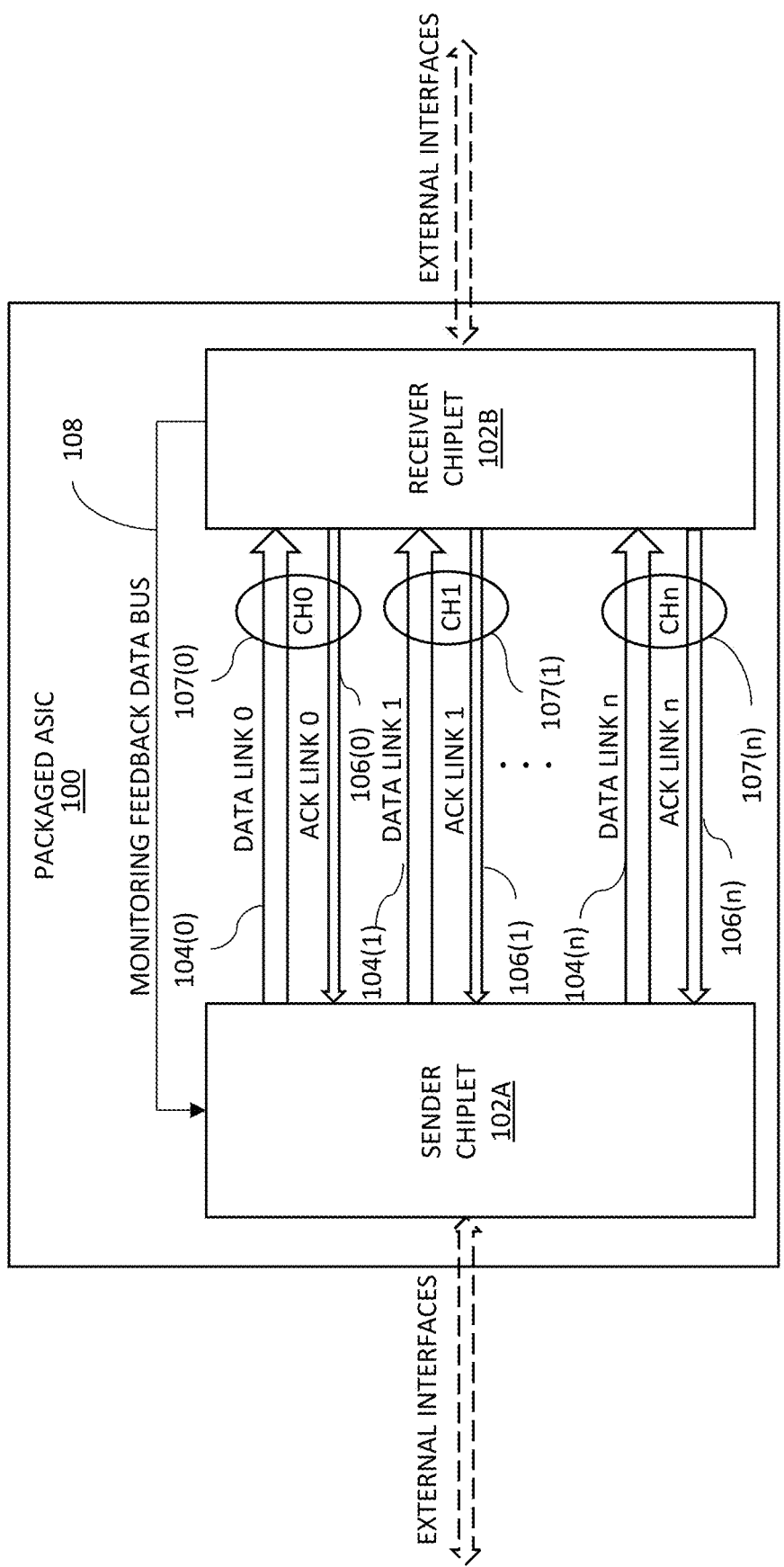
FIG. 1 illustrates a schematic block diagram illustrating connectivity between two chiplets in an application specific IC (ASIC) package for use in an automotive system, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

General safety requirements for automotive-grade chiplets with regard to a failure that results in violation of a safety goal (i.e., a safety failure) may include detection of the failure within a specified time interval, indication of the failure to an application within a specified time interval, and transition to a safe state within a specified time interval.

The following detailed description presents various descriptions of specific certain embodiments. However, the innovations described herein can be embodied in a multitude of different ways, for example, as defined and covered by the claims and/or select examples. In the following description, reference is made to the drawings, in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the drawings, a particular number and arrangement of structures and components are presented for illustrative purposes and any desired number or arrangement of such structures and components may be present in various embodiments. Further, the structures shown in the figures may take any suitable form or shape according to material properties, fabrication processes, and operating conditions. For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 110a-110e), such a collection may be referred to herein without the letters (e.g., as "110").

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. The terms "substantially," "close," "approximately," "near," and "about," generally refer to being within +/−20% of a target value (e.g., within +/−5 or 10% of a target value) based on the context of a particular value as described herein or as known in the art.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example Embodiments

FIG. 1 illustrates a schematic block diagram of an ASIC package 100 including two chiplets: a sender chiplet 102A and a receiver chiplet 102B. FIG. 1 illustrates a simplified scenario in which the sender chiplet 102A transmits data to the receiver chiplet 102B over one or more of n data links 104(1)-104(n) and the receiver chiplet 102B sends an acknowledgement back to the sender chiplet 102A over the corresponding one or more acknowledgement (ACK) links 106(1)-106(n). A data link 104 and corresponding ACK link 106 may be designated as a communication channel 107. A monitoring feedback data bus 108 is provided between the chiplets 102A, 102B, for monitoring the health of the data channels 104(1)-104(n) and for providing continuous feedback to the sender chiplet 102A, as will be described in greater detail below. In general, the bus 108 provides a physical link (serial or parallel) that sends periodic packets back to the receiver (e.g., as a backchannel). The format of packets and the fields in the packets will be fixed between sender and receiver. The packets may indicate link quality for each of the physical link. In addition, the packets may also indicate internal queues depth at the receiver.

In alternative embodiments, data communication between chiplets 102A, 102B (e.g., communication channels 107), and/or the monitoring feedback data bus 108 can be fully bidirectional.

In accordance with features of embodiments described herein, any number of different protocols and/or types of physical links may be used to implement the communication channels 107 (e.g., data links 104 and ACK links 106). Additionally and/or alternatively, the channels 107 may be implemented using parallel interfaces or serial interfaces.

Figure 2A:
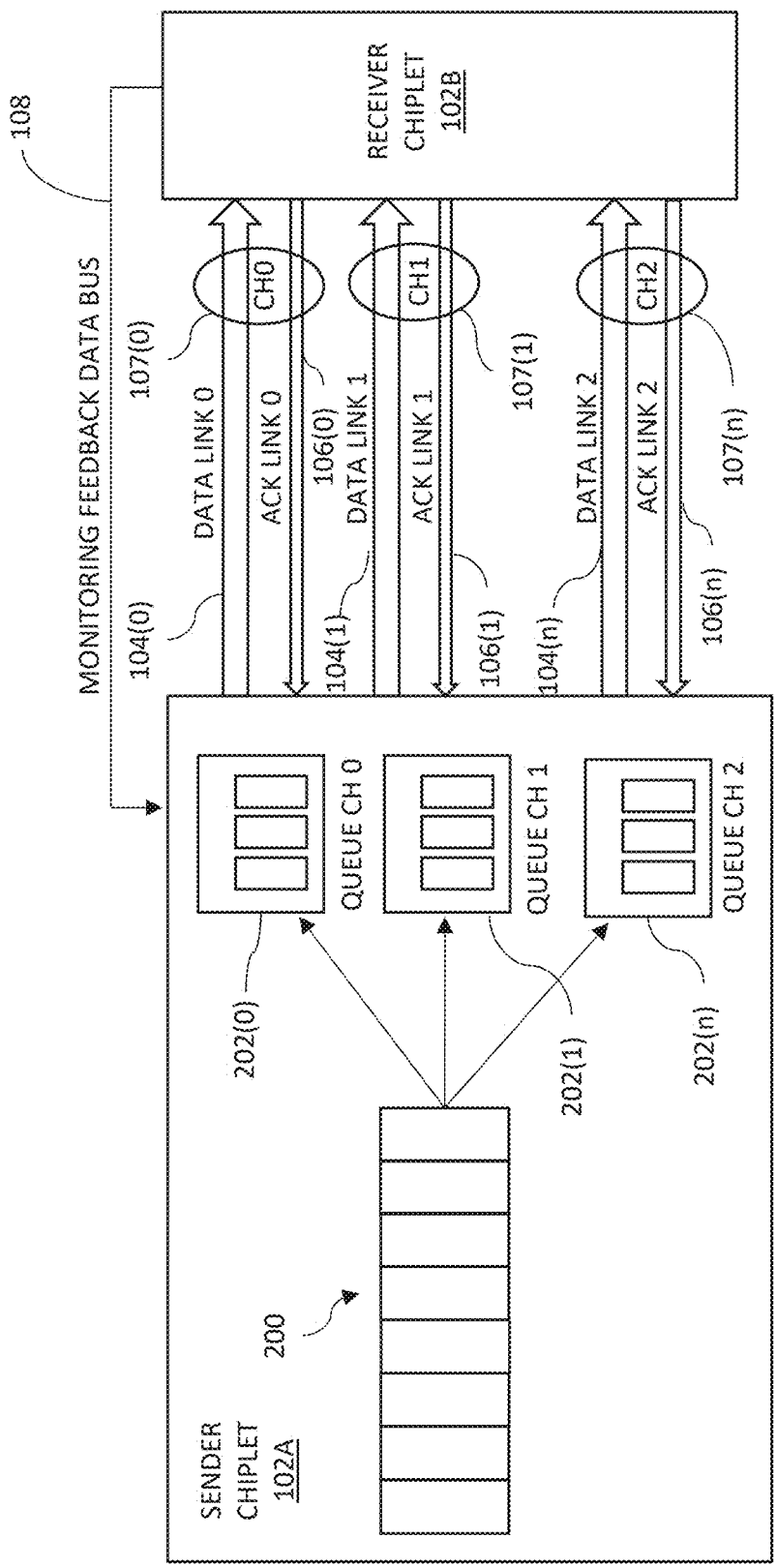
FIG. 2A illustrates a schematic block diagram illustrating communication between the two chiplets of the ASIC of FIG. 1 during normal operation, according to some examples of the present disclosure.
Figure 2B:
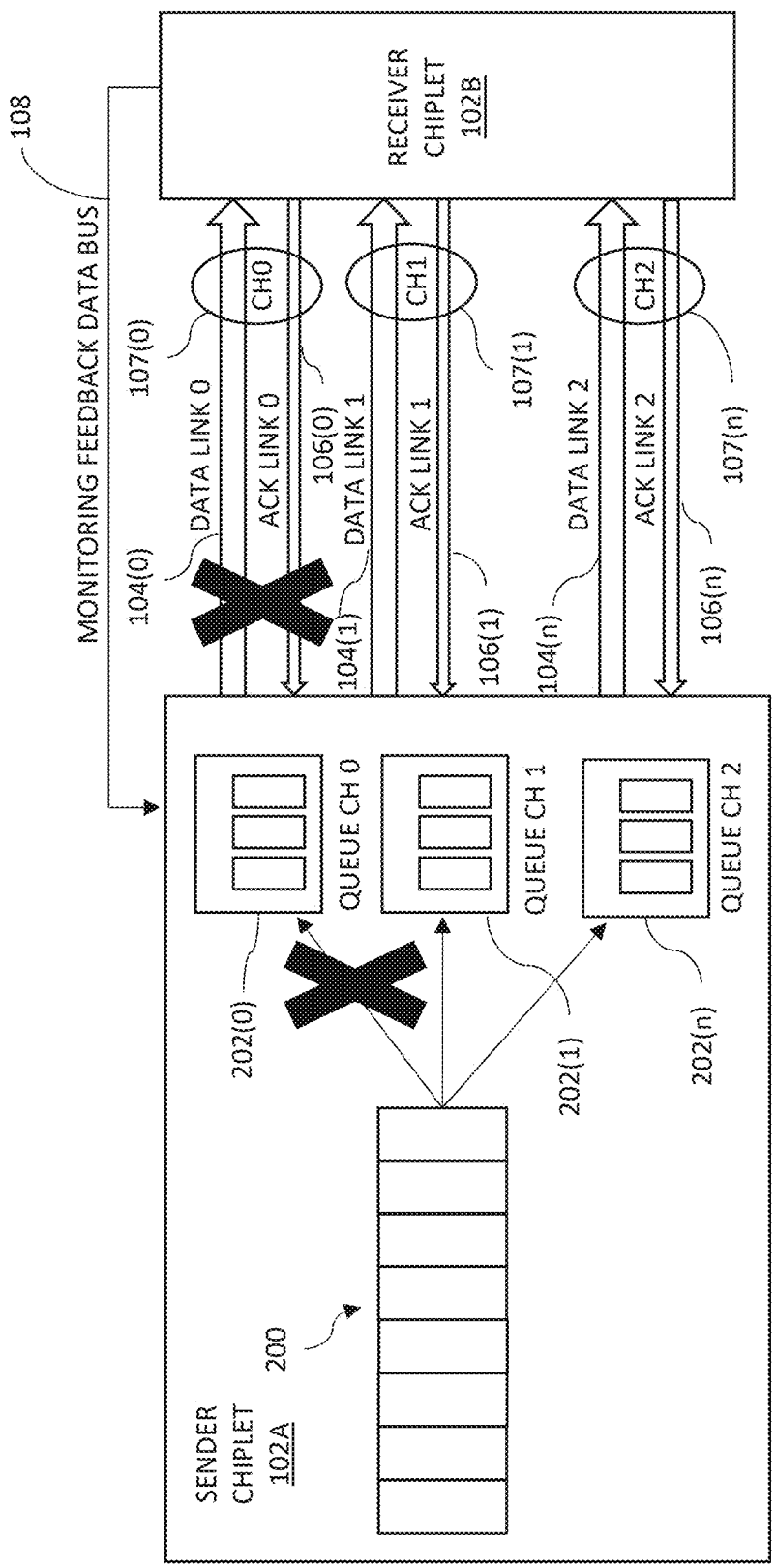
FIG. 2B illustrates a schematic block diagram illustrating communication between the two chiplets of the ASIC of FIG. 1 when a channel between the chiplets is experiencing an error, according to some examples of the present disclosure.

Embodiments described herein address various aspects of functional safety and reliability of automotive-grade chiplets. Referring now to FIGS. 2A and 2B, in one aspect of embodiments described herein, the need for backup/redundant physical data channels is addressed. In particular, the feedback mechanism from the receiver chiplet 102B to the sender chiplet 102A comprising the monitoring feedback data bus 108 monitors the health of the communication channels 107 and provides feedback on the link health (e.g., the temperature of the link, the reliability of the link, the speed of the link, the error-proneness of the link, etc.) to a scheduler 200 of the sender chiplet 102A as described above. As shown in FIGS. 2A and 2B, each communications channel 107(0)-107(n) has associated therewith an egress queue 202(0)-202(n) in which packets scheduled by the scheduler 200 to be transmitted to the receiver chiplet 102B via the corresponding channel 107(0)-107(n) are stored or buffered. If the feedback mechanism indicates that there is a problem on one of the channels (e.g., communications channel 107(0) in FIG. 2B), the scheduler 200 can switch the data transmission to a backup communications channel. In another aspect, a defective communications channel can be removed from the send-receive communications link. In this scenario, based on feedback from the receiver chiplet 102B on the monitoring feedback data bus 108, the sender chiplet 102A will continue to work as before as if the defective communications channel is not part of the communications interface between the chiplets. Based on the number of available functional (or non-defective) data channels, the sender chiplet 102A can spread the data across only the non-defective/functional channels. In either of the foregoing scenarios, and as will be described in greater detail below, the scheduler 200 can implement a round robin (RR) scheduling scheme across the channels 107 or it can balance the flows to ensure that the channels are optimally used. Such balancing can be performed using randomization or an algorithmic hash or method on the flow of traffic. Congestion-based load balancing may also be implemented, in which the sender chiplet 102A makes channel selection decisions based on egress queue occupancy of the receiver chiplet 102B, which information can be fed back to the sender chiplet 102A via heartbeat packets on the monitoring feedback data bus 108.

In yet another aspect, mechanisms are provided for monitoring the health of the link between the sender and receiver. In particular, adding a sequence number per packet (or flow control unit/flow control digit (flit)) can ensure that a missing or corrupt packet can easily be identified and acknowledged. By adding a sequence number to the ACKs, the receiver chiplet 102B will be able to identify where the error occurred and could request a retransmission of the packet(s). All of this can be performed in a pure hardware layer without involving software, thereby increasing the speed with which errors can be detected and recovered from. A sequence number also allows for the order of the data to be properly provided on the receiver chiplet 102B.

Packets/flits traveling through physical links nominally use their own channel number; however, when a link failover occurs and data is merged into another channel, the multiple channel numbered data packets/flits can travel through the same physical channel, meaning that they may need to be demultiplexed by the receiver chiplet 102B.

Health monitoring of links 104, 106, may be performed in a variety of ways. For example, the links may be protected through coding techniques, such as parity. In serial communications, a serializer-deserializer (SER-DES) provide give feedback regarding whether a corresponding bit error rate (BER) is increasing. Packets/flits can have a cyclic redundancy check code (CRC) that can be checked by the receiver chiplet 102B. Adding CRC increases the length of every packet by a few bytes (which consumes some bandwidth) but provides the flexibility to identify link errors regardless of underlying physical communications. Timeout mechanisms to identify situations in which an ACK was expected but not received within a particular time interval on a particular channel can indicate the possibility of the packet not reaching the receiver or of ACK getting corrupted.

In certain embodiments, the health may be monitored on a link-by-link basis, with link-specific information used by the scheduler to spread data packets across the links in a manner such that healthy links are used more. Additionally and/or alternatively, if health information received indicates that the temperature of a link is too high or that the link is otherwise compromised, the scheduler may avoid sending data packets on the link until the situation is resolved.

Feedback monitoring bus 108 can carry the one or more of periodic heartbeat packs indicating to the sender chiplet 102A that the receiver chiplet 102B is up and alive and periodic packets containing health per channel information and an indication of whether the sender chiplet should switch to an alternate or the backup channel. The integrity of the feedback monitoring bus 108 could also be protected through CRC, etc. Vitals such as temperature of the receiver chiplet 102B can also be communicated via the feedback monitoring bus, to enable corrective action to be taken.

Figure 3A:
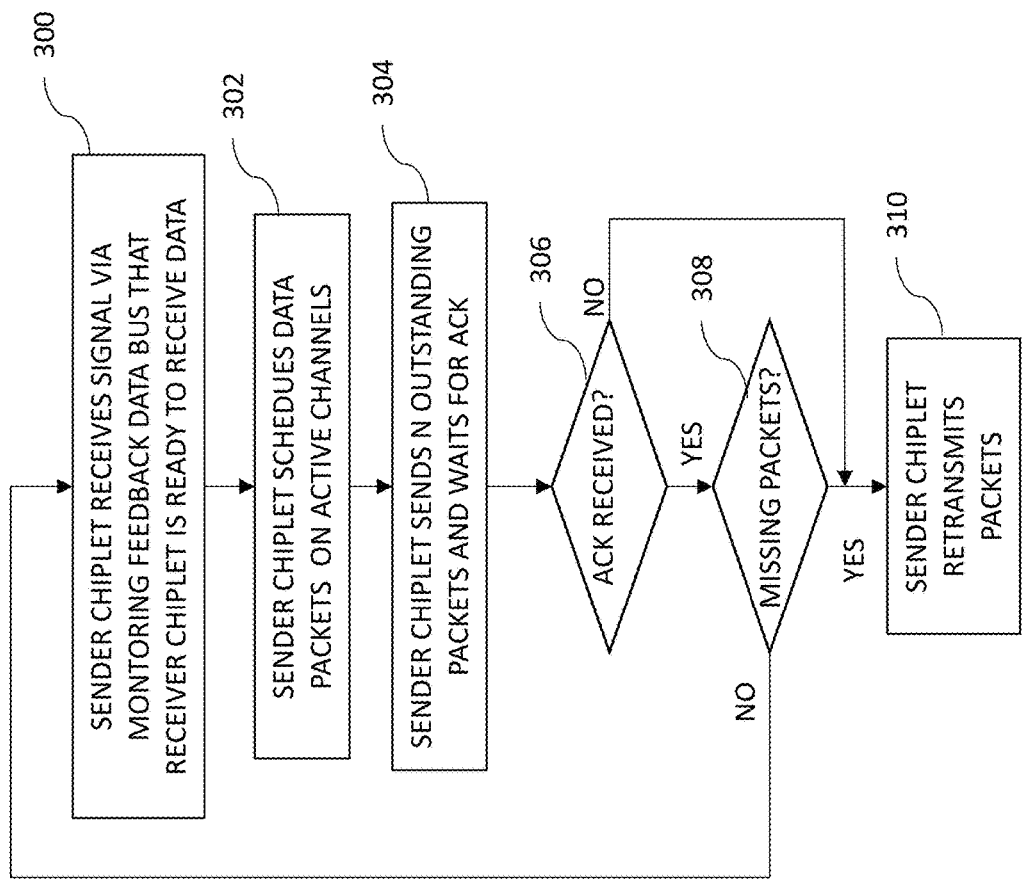
FIG. 3A is a flow chart illustrating example operation of a sender chiplet of the ASIC of FIG. 1, according to some examples of the present disclosure.

FIG. 3A is a flow chart illustrating example operation of a sender chiplet, such as the sender chiplet 102A (FIG. 1) according to some examples of the present disclosure.

In operation 300, the sender chiplet receives an indication from a receiver chiplet, such as the receiver chiplet 102B (FIG. 1) that the receiver chiplet is ready to receive data via a communications interface between the chiplets. In particular embodiments, this indication is communicated through a feedback monitoring data bus (such as the bus 108 (FIG. 1)) between the chiplets and eventually to the upper layers of the sender chiplet.

In operation 302, the sender chiplet schedules data packets to be sent to the receiver chiplet. In certain embodiments, based on the articular algorithm implemented by the scheduler (e.g., round robin or load balancing), the lower hardware layers schedule packets on the active communications channels (e.g., channels 107 (FIG. 1)).

In operation 304, the sender chiplet sends N outstanding packets, based on its local buffer, to the receiver chiplet.

In operation 306, the sender chiplet awaits an ACK from the receiver chiplet on the ACK link of the communications channel.

If an ACK is received by the sender chiplet before a timeout occurs, in operation 308, a determination is made whether the ACK indicates there are missing packets. In particular embodiments, a "missing packet" may result from and/or be defined by any of the following conditions: (1) an ACK timeout; (2) a packet having a nonsequential sequence number; or (3) an ACK packet with a CRC error.

If it is determined in operation 308 that the ACK does not indicate there are missing packets, execution returns to operation 300.

If it is determined in operation 308 that the ACK indicates there are missing packets, execution proceeds to 310, in which the sender chiplet retransmits the packets.

Returning to operation 306, if an ACK is not received by the sender chiplet before a timeout occurs, in operation 310, the sender chiplet retransmits the packets.

Figure 3B:
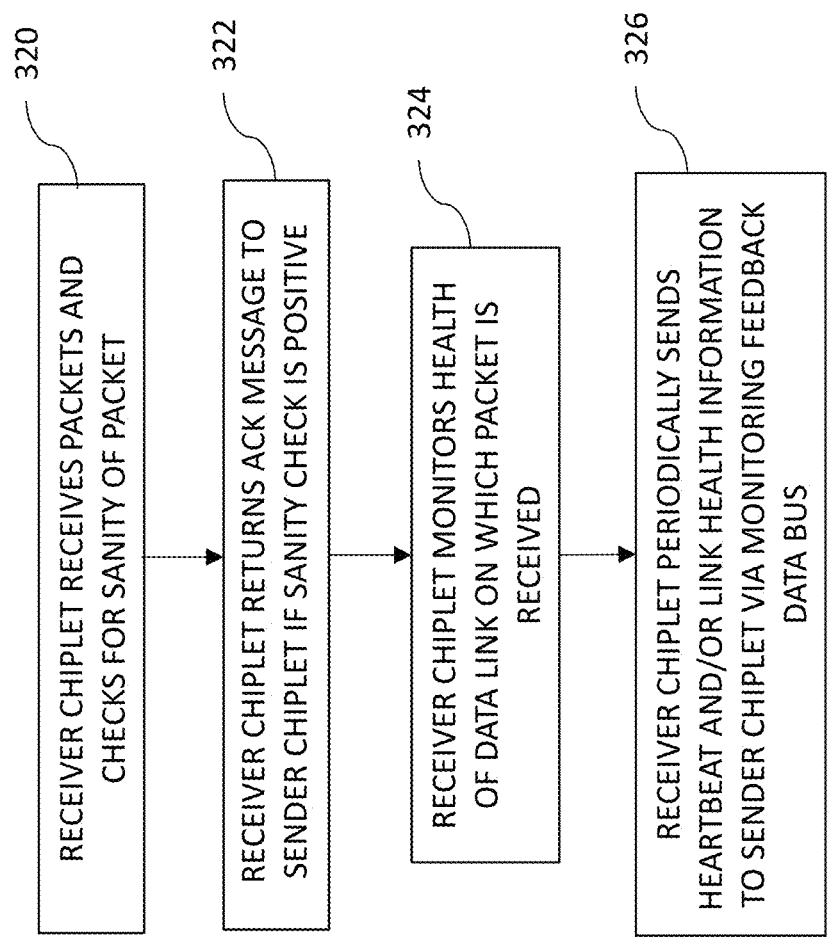
FIG. 3B is a flow chart illustrating example operation of a receiver chiplet of the ASIC of FIG. 1, according to some examples of the present disclosure.

FIG. 3B is a flow chart illustrating example operation of a receiver chiplet of the ASIC of FIG. 1, according to some examples of the present disclosure.

In operation 320, the receiver chiplet receives packets on a data link of communications channel and performs a sanity check, which may involve checking the sequence number and/or the CRC of the packets, for example.

In operation 322, the receiver chiplet returns an ACK message to the sender chiplet on the corresponding ACK link if the sanity check is positive.

In operation 324, the receiver chiplet can also monitor the health of the data link using other methods previously mentioned.

In operation 326, the receiver periodically sends heartbeat as well as health information back to the sender on the monitoring feedback data bus.

In particular, via the operations shown in FIG. 3B, health monitoring using the backchannel will allow control of the links used to transfer data in the forward path.

Figure 4A:
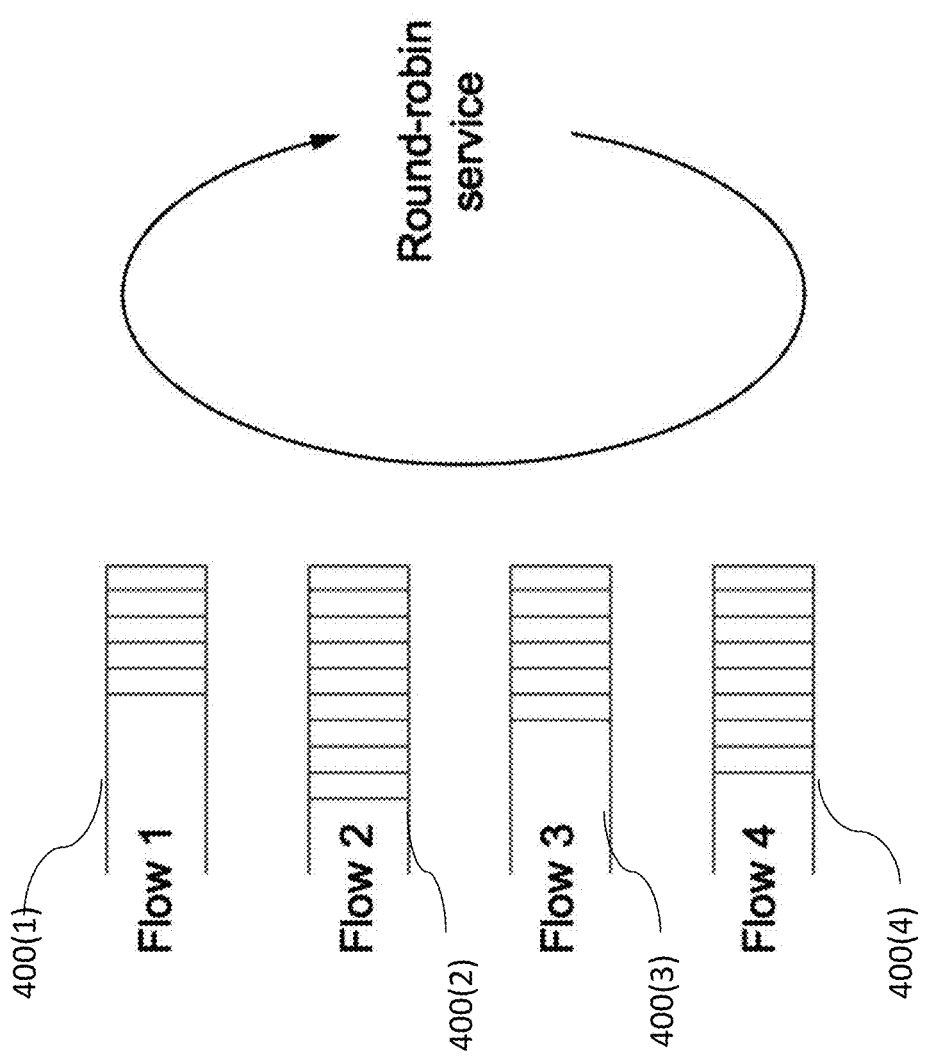
FIG. 4A illustrates a manner in which packets may be scheduled over the multiple data channels between the two chiplets of the ASIC of FIG. 1, according to some examples of the present disclosure.

FIG. 4A illustrates a basic round robin method by which to schedule flows 400(1)-400(4) over the multiple data links shown in FIGS. 1, 2A, and 2B. In round robin scheduling, a flow is forwarded to each communications channel in turn and the process is then repeated.

Figure 4B:
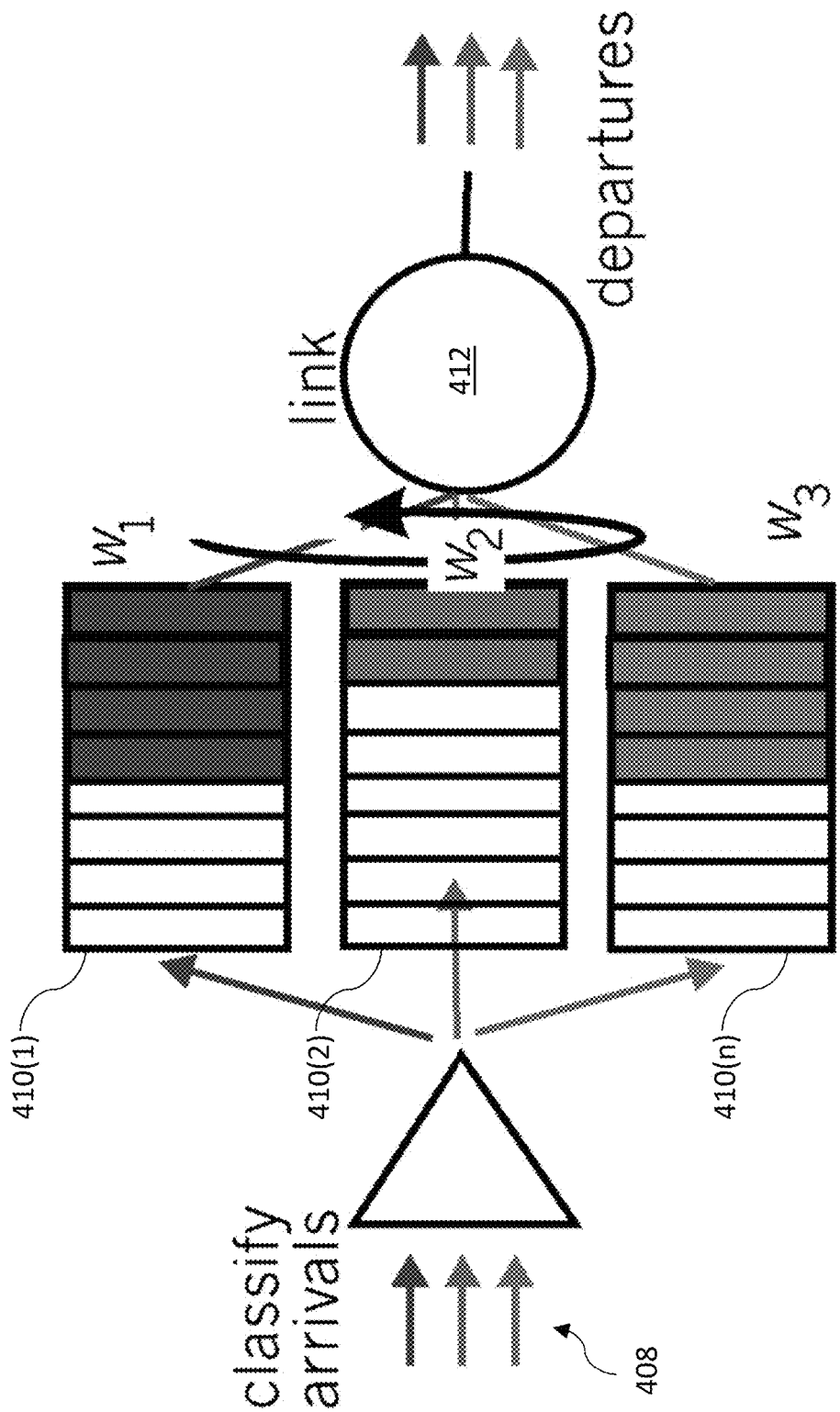
FIG. 4B illustrates a manner in which traffic may be classified and a decision is made on which one of the multiple data channels between the two chiplets of the ASIC of FIG. 1 to send the packets, according to some examples of the present disclosure.

FIG. 4B illustrates a method of scheduling flows in which the traffic is classified and one of the communications channels is selected for forwarding each of the flows. As illustrated in FIG. 4B, data traffic 408 is first classified into different queues 410(1)-410(n) before a decision is made which physical data link 412 to use to send the data. The classification can be based on load balancing, on receiver queue size, or other considerations.

Figure 5:
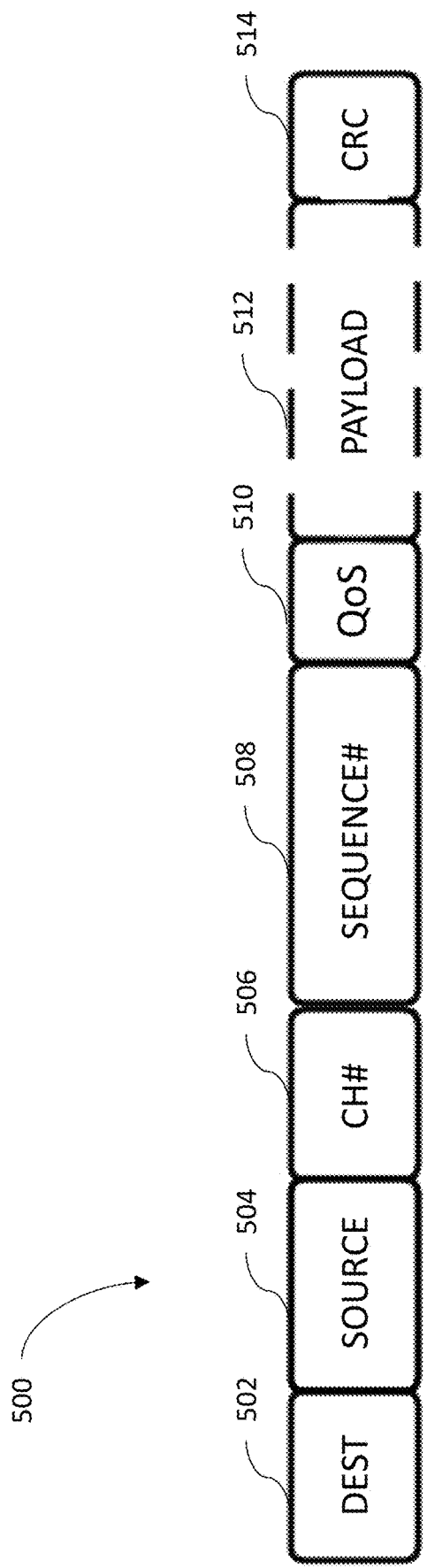
FIG. 5 illustrates a format of a packet that may be exchanged between the two chiplets of the ASIC of FIG. 1, according to some examples of the present disclosure.

FIG. 5 illustrates a format of a packet 500 for use in embodiments describe herein. As shown in FIG. 5, the packet 500 includes a destination (Dest) identifier 502, a Source identifier 504, a Channel Number (CH #) 506, a sequence number (Sequence #) 508, a QoS indicator 510, a payload 512, and a CRC 514.

Example AV Management System

Figure 6:
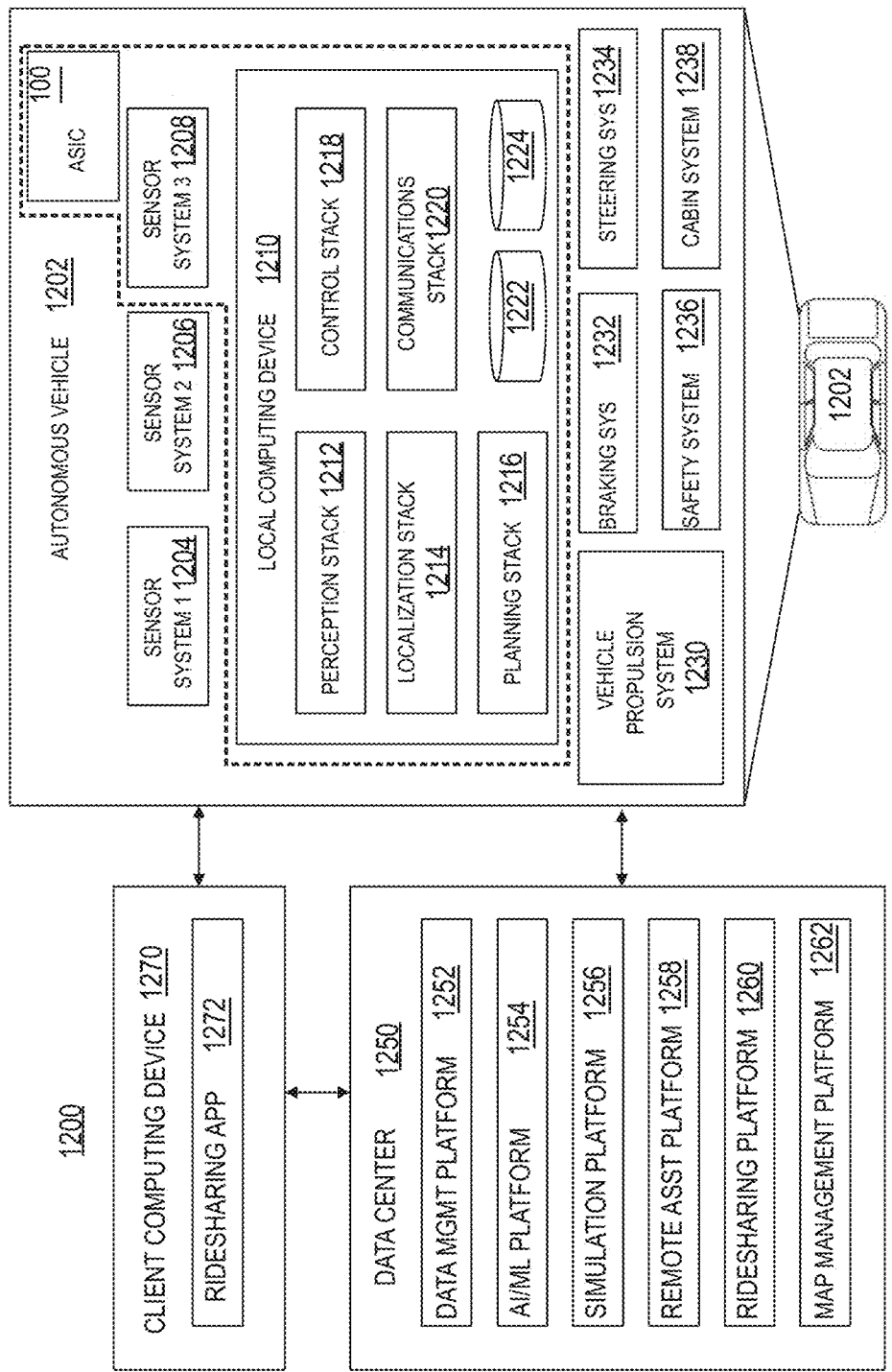
FIG. 6 illustrates an example system environment that can be used to facilitate autonomous vehicle (AV) dispatch and operations and in which the ASIC of FIG. 1 may be deployed, according to some examples of the present disclosure.

Turning now to FIG. 6, illustrated therein is an example of an AV management system 1200. One of ordinary skill in the art will understand that, for the AV management system 1200 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV management system 1200 includes an AV 1202, a data center 1250, and a client computing device 1270. The AV 1202, the data center 1250, and the client computing device 1270 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 1202 can navigate about roadways without a human driver based on sensor signals generated by multiple sensor systems 1204, 1206, and 1208. The sensor systems 1204-1208 can include different types of sensors and can be arranged about the AV 1202. For instance, the sensor systems 1204-1208 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 1204 can be a camera system, the sensor system 1206 can be a LIDAR system, and the sensor system 1208 can be a RADAR system. Other examples may include any other number and type of sensors.

AV 1202 can also include several mechanical systems that can be used to maneuver or operate AV 1202. For instance, the mechanical systems can include vehicle propulsion system 1230, braking system 1232, steering system 1234, safety system 1236, and cabin system 1238, among other systems. Vehicle propulsion system 1230 can include an electric motor, an internal combustion engine, or both. The braking system 1232 can include an engine brake, a wheel braking system (e.g., a disc braking system that utilizes brake pads), hydraulics, actuators, and/or any other suitable componentry configured to assist in decelerating AV 1202. The steering system 1234 can include suitable componentry configured to control the direction of movement of the AV 1202 during navigation. Safety system 1236 can include lights and signal indicators, a parking brake, airbags, and so forth. The cabin system 1238 can include cabin temperature control systems, in-cabin entertainment systems, and so forth. In some examples, the AV 1202 may not include human driver actuators (e.g., steering wheel, handbrake, foot brake pedal, foot accelerator pedal, turn signal lever, window wipers, etc.) for controlling the AV 1202. Instead, the cabin system 1238 can include one or more client interfaces (e.g., Graphical User Interfaces (GUIs), Voice User Interfaces (VUIs), etc.) for controlling certain aspects of the mechanical systems 1230-1238.

AV 1202 can additionally include a local computing device 1210 that is in communication with the sensor systems 1204-1208, the mechanical systems 1230-1238, the data center 1250, and the client computing device 1270, among other systems. The local computing device 1210 can include one or more processors and memory, including instructions that can be executed by the one or more processors. The instructions can make up one or more software stacks or components responsible for controlling the AV 1202; communicating with the data center 1250, the client computing device 1270, and other systems; receiving inputs from riders, passengers, and other entities within the AV's environment; logging metrics collected by the sensor systems 1204-1208; and so forth. In this example, the local computing device 1210 includes a perception stack 1212, a mapping and localization stack 1214, a planning stack 1216, a control stack 1218, a communications stack 1220, a High Definition (HD) geospatial database 1222, and an AV operational database 1224, among other stacks and systems.

Perception stack 1212 can enable the AV 1202 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 1204-1208, the mapping and localization stack 1214, the HD geospatial database 1222, other components of the AV, and other data sources (e.g., the data center 1250, the client computing device 1270, third-party data sources, etc.). The perception stack 1212 can detect and classify objects and determine their current and predicted locations, speeds, directions, and the like. In addition, the perception stack 1212 can determine the free space around the AV 1202 (e.g., to maintain a safe distance from other objects, change lanes, park the AV, etc.). The perception stack 1212 can also identify environmental uncertainties, such as where to look for moving objects, flag areas that may be obscured or blocked from view, and so forth.

Mapping and localization stack 1214 can determine the AV's position and orientation (pose) using different methods from multiple systems (e.g., GPS, IMUs, cameras, LIDAR, RADAR, ultrasonic sensors, the HD geospatial database 1222, etc.). For example, in some examples, the AV 1202 can compare sensor data captured in real-time by the sensor systems 1204-1208 to data in the HD geospatial database 1222 to determine its precise (e.g., accurate to the order of a few centimeters or less) position and orientation. The AV 1202 can focus its search based on sensor data from one or more first sensor systems 1204 (e.g., GPS) by matching sensor data from one or more second sensor systems 1206 (e.g., LIDAR). If the mapping and localization information from one system is unavailable, the AV 1202 can use mapping and localization information from a redundant system and/or from remote data sources.

The planning stack 1216 can determine how to maneuver or operate the AV 1202 safely and efficiently in its environment. For example, the planning stack 1216 can receive the location, speed, and direction of the AV 1202, geospatial data, data regarding objects sharing the road with the AV 1202 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 1202 from one point to another. The planning stack 1216 can determine multiple sets of one or more mechanical operations that the AV 1202 can perform (e.g., go straight at a specified speed or rate of acceleration, including maintaining the same speed or decelerating; power on the left blinker, decelerate if the AV is above a threshold range for turning, and turn left; power on the right blinker, accelerate if the AV is stopped or below the threshold range for turning, and turn right; decelerate until completely stopped and reverse; etc.), and select the best one to meet changing road conditions and events. If something unexpected happens, the planning stack 1216 can select from multiple backup plans to carry out. For example, while preparing to change lanes to turn right at an intersection, another vehicle may aggressively cut into the destination lane, making the lane change unsafe. The planning stack 1216 could have already determined an alternative plan for such an event, and upon its occurrence, help to direct the AV 1202 to go around the block instead of blocking a current lane while waiting for an opening to change lanes.

The control stack 1218 can manage the operation of the vehicle propulsion system 1230, the braking system 1232, the steering system 1234, the safety system 1236, and the cabin system 1238. The control stack 1218 can receive sensor signals from the sensor systems 1204-1208 as well as communicate with other stacks or components of the local computing device 1210 or a remote system (e.g., the data center 1250) to effectuate operation of the AV 1202. For example, the control stack 1218 can implement the final path or actions from the multiple paths or actions provided by the planning stack 1216. This can involve turning the routes and decisions from the planning stack 1216 into commands for the actuators that control the AV's steering, throttle, brake, and drive unit.

The communication stack 1220 can transmit and receive signals between the various stacks and other components of the AV 1202 and between the AV 1202, the data center 1250, the client computing device 1270, and other remote systems. The communication stack 1220 can enable the local computing device 1210 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 420 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 1222 can store HD maps and related data of the streets upon which the AV 1202 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 1224 can store raw AV data generated by the sensor systems 1204-1208 and other components of the AV 1202 and/or data received by the AV 1202 from remote systems (e.g., the data center 1250, the client computing device 1270, etc.). In some examples, the raw AV data can include HD LIDAR point cloud data, image or video data, RADAR data, GPS data, and other sensor data that the data center 450 can use for creating or updating AV geospatial data.

The data center 1250 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 1250 can include one or more computing devices remote to the local computing device 1210 for managing a fleet of AVs and AV-related services. For example, in addition to managing the AV 1202, the data center 450 may also support a ridesharing service, a delivery service, a remote/roadside assistance service, street services (e.g., street mapping, street patrol, street cleaning, street metering, parking reservation, etc.), and the like.

The data center 1250 can send and receive various signals to and from the AV 1202 and the client computing device 1270. These signals can include sensor data captured by the sensor systems 1204-1208, roadside assistance requests, software updates, ridesharing pick-up and drop-off instructions, and so forth. In this example, the data center 1250 includes one or more of a data management platform 1252, an Artificial Intelligence/Machine Learning (AI/ML) platform 1254, a simulation platform 1256, a remote assistance platform 1258, a ridesharing platform 1260, and a map management platform 1262, among other systems.

Data management platform 1252 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 1250 can access data stored by the data management platform 1252 to provide their respective services.

The AI/ML platform 1254 can provide the infrastructure for training and evaluating machine learning algorithms for operating the AV 1202, the simulation platform 1256, the remote assistance platform 1258, the ridesharing platform 1260, the map management platform 1262, and other platforms and systems. Using the AI/ML platform 1254, data scientists can prepare data sets from the data management platform 1252; select, design, and train machine learning models; evaluate, refine, and deploy the models; maintain, monitor, and retrain the models; and so on.

The simulation platform 1256 can enable testing and validation of the algorithms, machine learning models, neural networks, and other development efforts for the AV 1202, the remote assistance platform 1258, the ridesharing platform 1260, the map management platform 1262, and other platforms and systems. The simulation platform 1256 can replicate a variety of driving environments and/or reproduce real-world scenarios from data captured by the AV 1202, including rendering geospatial information and road infrastructure (e.g., streets, lanes, crosswalks, traffic lights, stop signs, etc.) obtained from the map management platform 1262; modeling the behavior of other vehicles, bicycles, pedestrians, and other dynamic elements; simulating inclement weather conditions, different traffic scenarios; and so on.

The remote assistance platform 1258 can generate and transmit instructions regarding the operation of the AV 1202. For example, in response to an output of the AI/ML platform 1254 or other system of the data center 1250, the remote assistance platform 1258 can prepare instructions for one or more stacks or other components of the AV 1202.

The ridesharing platform 1260 can interact with a customer of a ridesharing service via a ridesharing application 1272 executing on the client computing device 470. The client computing device 1270 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general-purpose computing device for accessing the ridesharing application 1272. The client computing device 1270 can be a customer's mobile computing device or a computing device integrated with the AV 1202 (e.g., the local computing device 1210). The ridesharing platform 1260 can receive requests to be picked up or dropped off from the ridesharing application 1272 and dispatch the AV 1202 for the trip.

Map management platform 1262 can provide a set of tools for the manipulation and management of geographic and spatial (geospatial) and related attribute data. The data management platform 1252 can receive LIDAR point cloud data, image data (e.g., still image, video, etc.), RADAR data, GPS data, and other sensor data (e.g., raw data) from one or more AVs 1202, Unmanned Aerial Vehicles (UAVs), satellites, third-party mapping services, and other sources of geospatially referenced data. The raw data can be processed, and map management platform 1262 can render base representations (e.g., tiles (2D), bounding volumes (3D), etc.) of the AV geospatial data to enable users to view, query, label, edit, and otherwise interact with the data. Map management platform 1262 can manage workflows and tasks for operating on the AV geospatial data. Map management platform 1262 can control access to the AV geospatial data, including granting or limiting access to the AV geospatial data based on user-based, role-based, group-based, task-based, and other attribute-based access control mechanisms. Map management platform 1262 can provide version control for the AV geospatial data, such as to track specific changes that (human or machine) map editors have made to the data and to revert changes when necessary. Map management platform 1262 can administer release management of the AV geospatial data, including distributing suitable iterations of the data to different users, computing devices, AVs, and other consumers of HD maps. Map management platform 1262 can provide analytics regarding the AV geospatial data and related data, such as to generate insights relating to the throughput and quality of mapping tasks.

In some examples, the map viewing services of map management platform 1262 can be modularized and deployed as part of one or more of the platforms and systems of the data center 1250. For example, the AI/ML platform 1254 may incorporate the map viewing services for visualizing the effectiveness of various object detection or object classification models, the simulation platform 1256 may incorporate the map viewing services for recreating and visualizing certain driving scenarios, the remote assistance platform 1258 may incorporate the map viewing services for replaying traffic incidents to facilitate and coordinate aid, the ridesharing platform 1260 may incorporate the map viewing services into the client application 1272 to enable passengers to view the AV 1202 in transit en route to a pick-up or drop-off location, and so on.

In many examples, ASIC package may be another portion of AV 1202. Other parts of ASIC package 100 may be comprised appropriately in various components and blocks of the figure.

Example AV

Figure 7:
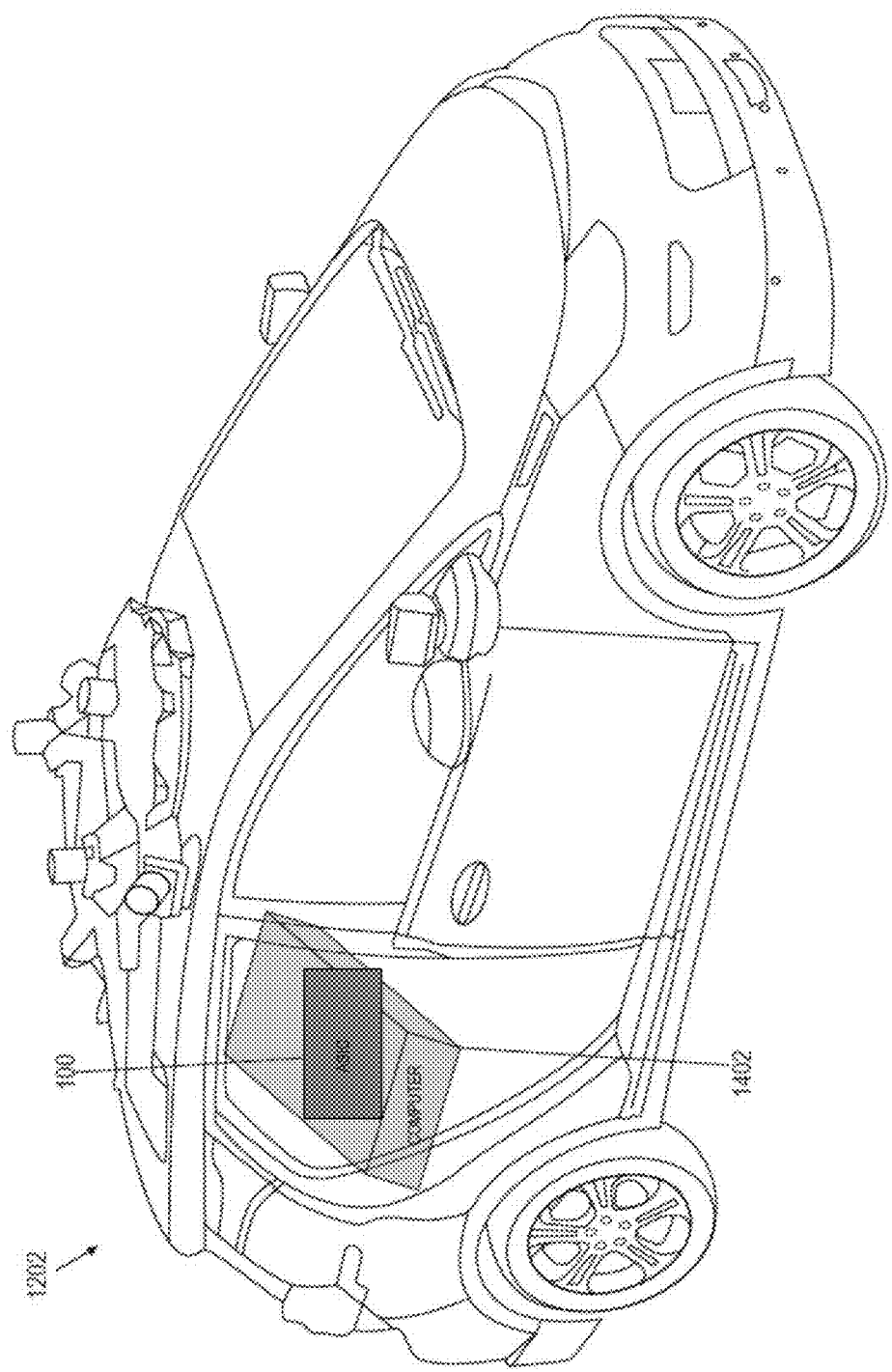
FIG. 7 is a schematic representation of an AV with an example system in which the ASIC of FIG. 1 may be deployed, according to some examples of the present disclosure, according to some examples of the present disclosure.

FIG. 7 is a schematic representation of an AV 1202 with example ASIC package 100, according to some examples of the present disclosure. Although AV 1202 is shown as a sedan, any suitable type of vehicle may be used with ASIC package 100 within the scope of the present disclosure. In various examples, one or more ASIC packages as described in reference to FIG. 1 may be included within AV management system 1200 and/or computing system 1300 as described in reference to FIGS. 6 and 7. ASIC packages may include any suitable components that perform any or some of the functionalities as described in FIGS. 6 and 7. For example, one or more ASIC packages may comprise local computing device 1210. In another example, one or more ASIC packages may comprise part of control stack 1218.

In some examples, one or more functionalities of AV management system 1200 may be comprised in an on-board computer 1402. In various examples, computer 1402 may be an Automated Driving System Computer (ADSC). In such examples, one or more IC devices may include a microprocessor and/or other semiconductor IC devices of the ADSC. In many examples, given its size, computer 1402 may be installed in a trunk of AV 1202 or toward a rear of AV 1202, although it will be recognized that the features of examples described herein may be advantageously deployed in systems in which computer 1402 is enclosed in another area of AV 1202. Computer 1402 may be removably attached to the chassis of AV 1202 and/or otherwise coupled to other systems of AV 1202 by any number of wireless or wired communication pathways. In many examples, computer 1402 is configured to connect to various sensors of AV 1202 and store large amounts of vehicle camera and sensor data in different kinds of storage devices, including solid-state data storage devices.

SELECTED EXAMPLES

Example 1 provides an integrated circuit (IC) package, the IC package including an automotive-grade IC package for automotive applications, the IC package including a first chiplet; a second chiplet electrically connected to the first chiplet via a plurality of communications channels; and a monitoring feedback bus for providing information regarding health of the communications channels from the second chiplet to the first chiplet.

Example 2 provides the IC package of example 1, in which each of the plurality of communications channels includes a data link and an ACK link.

Example 3 provides the IC package of example 2, in which the data links and the ACK links include bi-directional links.

Example 4 provides the IC package of example 2, in which the data links are serial links.

Example 5 provides the IC package of example 2, in which the data links are parallel links.

Example 6 provides the IC package of example 2, in which the data links are unidirectional links for transmitting data from the first chiplet to the second chiplet.

Example 7 provides the IC package of example 2, in which the ACK links are unidirectional links for transmitting acknowledgement messages from the second chiplet to the first chiplet.

Example 8 provides the IC package of any of examples 1-7, in which the first chiplet is a sender chiplet and the second chiplet is a receiver chiplet.

Example 9 provides the IC package of example 8, in which the sender chiplet includes a scheduler for selecting one of the communications channels on which to transmit data packets to the second chiplet.

Example 10 provides the IC package of example 9, in which the scheduler schedules transmission of data pockets using a round robin technique.

Example 11 provides the IC package of example 9, in which the scheduler schedules transmission of data packets using a load balancing technique.

Example 12 provides a method including receiving at a first chiplet an indication from a second chiplet that the second chiplet is ready to receive data from the first chiplet via a feedback bus between the first and second chiplets, in which the first and second chiplets are connected via a plurality of communications channels, each including a data link and an acknowledgment (ACK) link; scheduling by a scheduler of the first chiplet data packets to be sent to the second chiplet via selected ones of the data links, in which the selected ones of the data links are determined to be functional; the first chiplet sending to the second chiplet N outstanding packets based on its local buffer; awaiting receipt by the first chiplet of an ACK message from the second chiplet on the ACK link corresponding to the data link on which data packets were sent; and, if the received ACK message indicates that packets are missing, resending the packets; in which the sender and receiver chiplets are automotive-grade chiplets.

Example 13 provides the method of example 12, in which if no ACK message is received, resending the packets.

Example 14 provides the method of example 12, in which each of the data packets includes at least one of a field including payload, a field including a cyclic redundancy check code (CRC), a field including a sequence identifier, and a field including a channel identifier.

Example 15 provides the method of example 12, in which the scheduler implements a round robin scheduling technique.

Example 16 provides the method of example 12, in which the scheduler implements a load balancing technique.

Example 17 provides a method including a receiver chiplet indicating to a sender chiplet that the receiver chiplet is prepared to receive data; the receiver chiplet receiving a packet on a data link of a communications channel; the receiver chiplet checking a sanity of the received packet; the receiver chiplet monitoring a health of the data link; and the receiver periodically sending information regarding the health of the data link to the sender chiplet; in which the receiver and sender chiplets are automotive grade chiplets.

Example 18 provides the method of example 17, further including periodically sending a heartbeat signal to the sender chiplet.

Example 19 provides the method of example 18, in which the information regarding the health of the data link is sent via a feedback data bus.

Example 20 provides the method of example 19, in which the heartbeat signal is sent via the feedback data bus.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the interior electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as exterior storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium including instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended examples. The specifications apply only to one non-limiting example and, accordingly, they should be construed as such. In the foregoing description, example embodiments have been described with reference to particular arrangements of components. Various modifications and changes may be made to such embodiments without departing from the scope of the appended examples. The description and drawings are, accordingly, to be regarded in an illustrative rather than in a restrictive sense.

Note that with the numerous examples provided herein, interaction may be described in terms of two, three, four, or more components; however, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Various operations may be described as multiple discrete actions or operations in turn in a manner that is most helpful in understanding the example subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended examples. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the examples appended hereto, Applicant wishes to note that the Applicant: (a) does not intend any of the appended examples to invoke paragraph (f) of 35 U.S.C. Section 112 as it exists on the date of the filing hereof unless the words "means for" or "step for" are specifically used in the particular examples; and (b) does not intend, by any statement in the Specification, to limit this disclosure in any way that is not otherwise reflected in the appended examples.

What is claimed is:

1. A method comprising:
    receiving, at a first chiplet from a second chiplet, an indication from the second chiplet that the second chiplet is ready to receive data from the first chiplet, wherein the indication is received via a feedback bus between the first and second chiplets, and wherein the first and second chiplets are connected via a plurality of communications channels each comprising a data link and an acknowledgment (ACK) link;
    scheduling, by a scheduler of the first chiplet, data packets to be sent to the second chiplet via selected ones of the data links, wherein the selected ones of the data links are determined to be functional, wherein the scheduler implements at least one of a round robin scheduling technique or a load balancing technique;
    sending, from the first chiplet to the second chiplet, N outstanding packets of the data packets based on its local buffer;
    awaiting, at the first chiplet, receipt of an ACK message from the second chiplet on the ACK link corresponding to the data link on which the N outstanding packets of the data packets were sent; and
    if the received ACK message indicates that packets of the N outstanding packets are missing, resending the missing packets,
    wherein the first and second chiplets are automotive-grade chiplets.

2. The method of claim 1, wherein, if no ACK message is received, resending the N outstanding packets of the data packets.

3. The method of claim 1, wherein each of the data packets includes at least one of a field including payload, a field including a cyclic redundancy check code (CRC), a field including a sequence identifier, or a field including a channel identifier.

4. An integrated circuit (IC) package, the IC package including an automotive-grade IC package for automotive applications, the IC package comprising:
    a first chiplet;
    a second chiplet electrically connected to the first chiplet via a plurality of communications channels; and
    a monitoring feedback bus for providing information regarding health of the plurality of communications channels,
    wherein the first chiplet comprises a scheduler configured to select one of the communications channels on which to transmit data packets to the second chiplet, and
    wherein the scheduler implements at least one of a round robin scheduling technique or a load balancing technique.

5. The IC package of claim 4, wherein each of the plurality of communications channels comprises a data link and an ACK link.

6. The IC package of claim 5, wherein the data links and the ACK links comprise bi-directional links.

7. The IC package of claim 5, wherein the data links are serial links.

8. The IC package of claim 5, wherein the data links are parallel links.

9. The IC package of claim 5, wherein the data links are unidirectional links for transmitting data from the first chiplet to the second chiplet.

10. The IC package of claim 5, wherein the ACK links are unidirectional links for transmitting acknowledgement messages from the second chiplet to the first chiplet.

11. The IC package of claim 4, wherein the first chiplet is a sender chiplet and the second chiplet is a receiver chiplet.

\* \* \* \* \*